Feb. 23, 1932.     H. I. F. EVERNDEN     1,846,957
WINDSCREEN FOR MECHANICALLY PROPELLED VEHICLES
Filed April 5, 1929     2 Sheets-Sheet 1
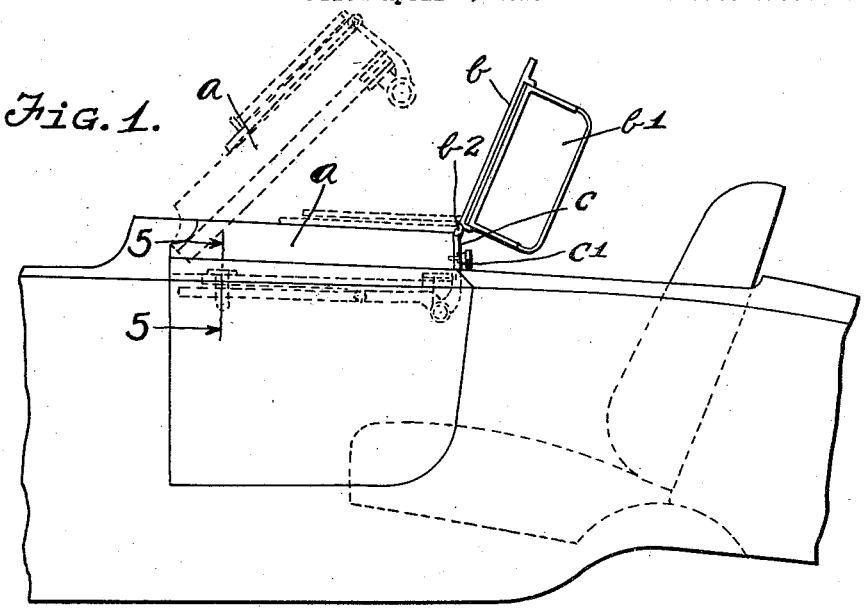
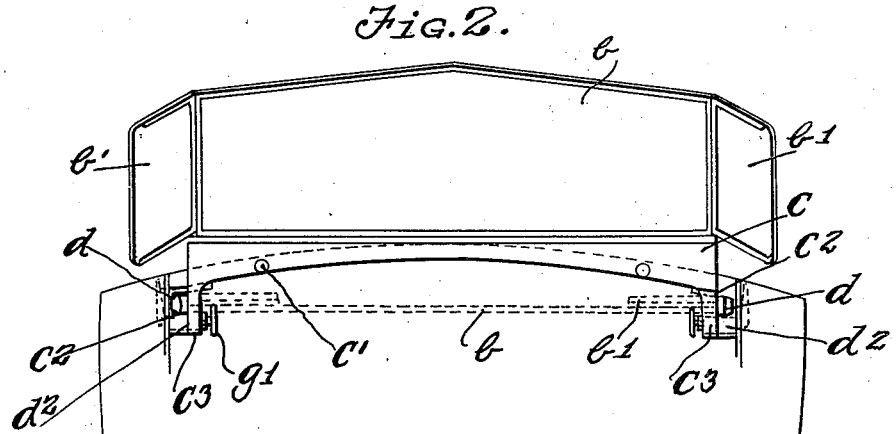
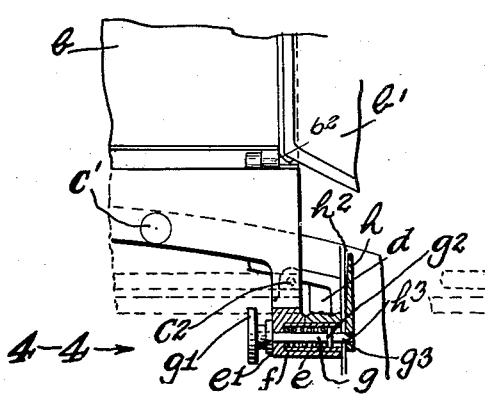
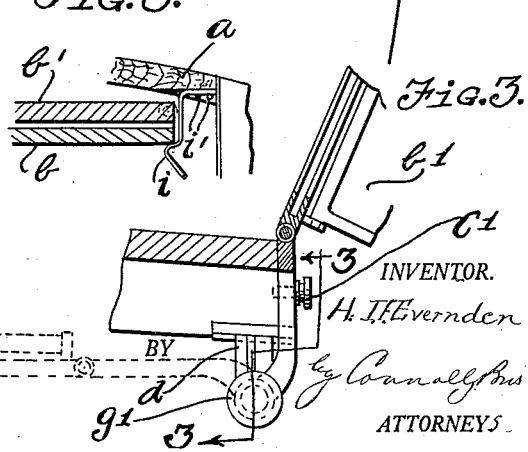
INVENTOR.
H. I. F. Evernden
BY
Connall & his
ATTORNEYS

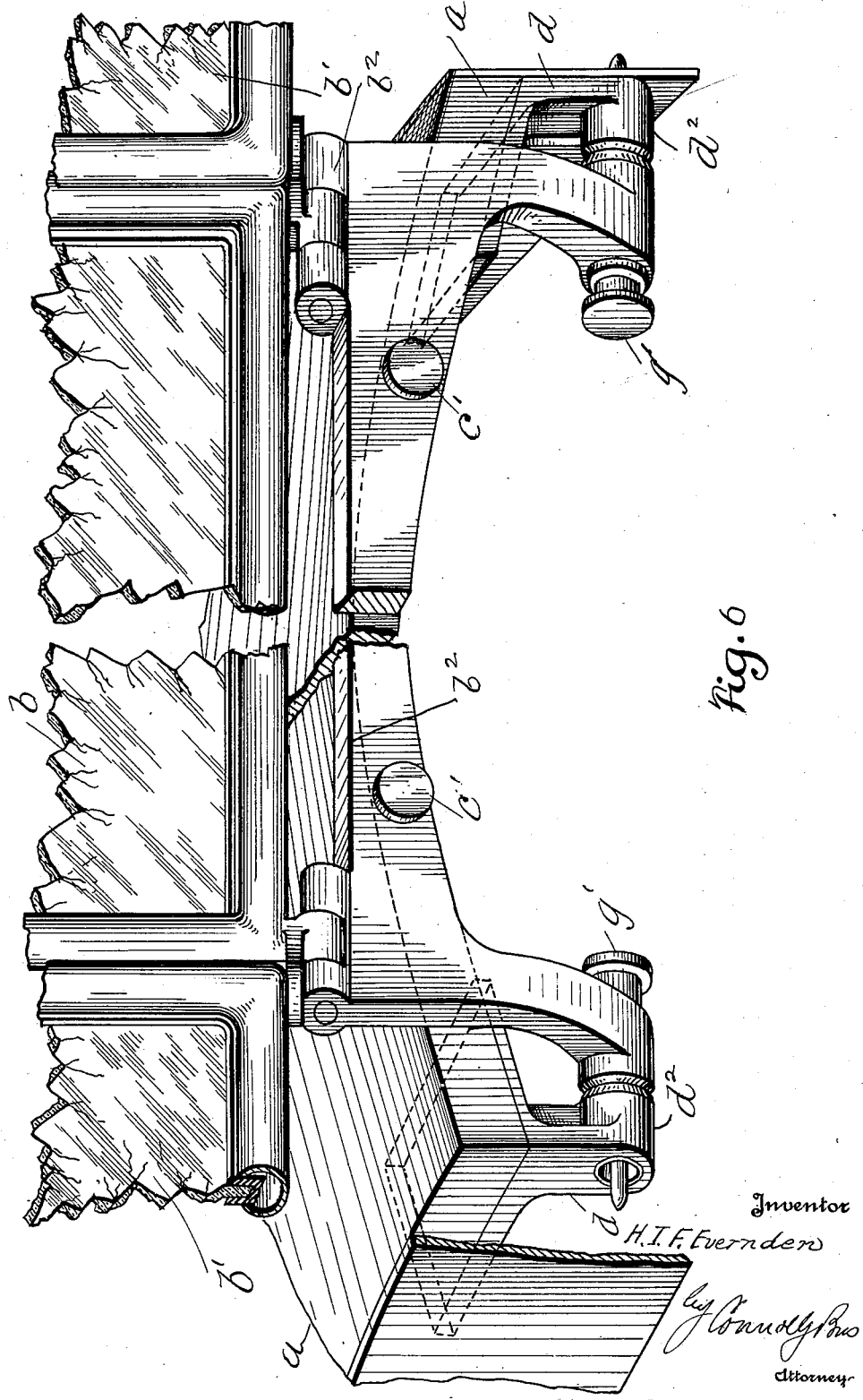

Patented Feb. 23, 1932

1,846,957

UNITED STATES PATENT OFFICE

HAROLD IVAN FREDERICK EVERNDEN, OF ITCHENOR GREEN, NEAR CHICHESTER, ENGLAND, ASSIGNOR TO ROLLS ROYCE LIMITED, OF DERBY, ENGLAND

WINDSCREEN FOR MECHANICALLY PROPELLED VEHICLES

Application filed April 5, 1929, Serial No. 352,715, and in Great Britain April 12, 1928.

This invention has reference to wind screens for mechanically driven vehicles. It is applicable to that class in which an open body is provided with a so-called "top deck" which extends over the feet and legs of the passengers, and (to facilitate the getting into and out of such seat) the top deck, or a part of it (hereinafter called the "hinged deck") swings upwards on a transverse hinge at its fore end.

In this form of body the wind screen hitherto has been arranged at or near the rear edge of the hinged deck, and hinged on a transverse axis, and so that when not in use it can lie along the top of the hinged deck.

The invention consists of a combination of a hinged deck and wind screen so arranged that the wind screen can not only be laid along the top of the hinged deck, but also can be turned under and made to assume a position parallel to and underneath the hinged deck.

To secure that I provide that the screen shall be hinged on two axes so related to the hinged deck that, with suitably shaped brackets or attachments carrying or constituting one of the hinges it can be rotated into any required position including that beneath the top deck.

An example of this invention is illustrated in the accompanying drawings.

Figure 1 is an elevation of the part of the body which contains the rear seat, the hinged deck and the wind screen. The screen is shown in its normal position in use and in dotted lines is also shown the hinged deck raised, with the screen lying upon the top of it and the screen both lying on the top of and underneath the hinged deck when in its lower position.

Figure 2 is an elevation of the screen and its attachment viewed from the rear, in dotted lines, being also shown the screen lying underneath the hinged deck.

Figure 3 is a part elevation and part section of the off side of the screen and hinge viewed from inside the body.

Figure 4 is a section on the line 3—3 of Figure 3.

Figure 5 is a scrap section on line 5—5 of Figure 1.

Figures 3, 4 and 5 are on a larger scale than Figures 1 and 2.

Figure 6 is a perspective view, on an enlarged scale of the hinge connections between the screen and the vehicle.

$a$ is part of the top deck of an automobile body covering the feet and legs of the persons sitting in the rear seat and hinged so as to be raised from its position in the usual manner. $b$ is a wind screen composed in the usual manner of glass contained in a metal frame, and having in the usual manner hinged side pieces $b^1$ at either end, also consisting of glass in metal frames. The screen $b$ is hinged at either end on hinges $b^2$ to a metal plate $c$ which is secured to the end of the deck when the screen is in its position for use, or lying on top of the deck, by two knurled or butterfly headed screws $c^1$. At either end of the metal plate $c$ are projections $c^2$ which are curved towards the front of the vehicle under the hinged deck and have their ends $c^3$ formed so as to form one member of transverse pivot hinges. $d$ are two metal brackets secured to the underside of the hinged top deck and having their ends $d^2$ also made circular to form members of the same pivot hinges at the ends $c^3$ of the metal plate $c$. $e$ are bushings which pass through two members of the hinges $c^3$ and $d^2$ and are tight with one of them. $e^1$ are shoulders formed within the bushings $e$ which serve as abutments for the springs $f$. $g$ are two spindles secured to knurled heads $g^1$ passing through the springs $f$ and having shoulders $g^2$ which form the other abutments for the springs $f$ and have projecting pointed ends $g^3$ projecting beyond the hinges and beyond the side of the hinged top deck. $h$ are two metal plates fixed to the side of the body frame opposite to the end of the side of the hinged top deck having vertical tapered grooves therein $h^2$ and recesses $h^3$ immediately opposite the ends $g^3$ of the spindles $g$ when the hinged deck is in its lower position. The grooves $h^2$ are deepest at their top and most shallow immediately above the recesses $h^3$. The underside of the top deck $a$ at or near the end of the screen when in its position underneath the said top deck is cut away at either side (Figure 5) and to its underside are secured two metal spring clips $i$ by screws $i^1$.

The way the apparatus works is as follows:—If it is desired to fold the screen out of use on top of the hinged body frame, the two sides $b^1$ are folded backwards and inwards until they lie along the main screen and the screen is folded forewards and downwards into position on the hinge $b$ in manner well known.

If on the other hand it is desired to fold the screen out of use under the top deck the side pieces $b^1$ are again folded backwards and inwards, the hinged top deck is raised in manner well known, the two screws $c^1$ are unscrewed from the end of the hinged top deck $a$ and the screen and the plate $c$ are pivoted downwards and forwards around the hinges formed by the members $c^3$, $d^2$ and the bushing $e$ underneath the hinged top deck $a$; when the screen is almost in a position parallel with the hinged top deck the ends of the folded side pieces $b^1$ strike the projecting end of the leaf springs $i$ forcing the same outwards until the complete screen has passed the springs, which clip it into position. The top deck is then lowered into position and as it is so lowered the projecting ends $g^3$ of the spindles $g$ impinge on the grooves $h^2$ of the metal plates $h$, forcing back the spindles on the springs $f$ until the springs $f$ force the said projecting points into the recesses $h^3$ thus securing the hinged deck in position.

When it is desired to raise the screen again into position the hinged top deck is released by pulling on the knurled heads $g^1$ of the pivots $g$ and the top deck again raised. A slight pull on the end of the screen is sufficient to release the same from the spring clips $i$ and the screen $a$ and plate $c$ are again pulled downwards and backwards hinging around the two hinges formed by the members $c^3$ and $d^2$ and the bushing $e$. When the metal plate $c$ is again in position lying along the end of the hinged top deck, it is secured thereto by screwing up the two screws $c^1$. The hinged top deck is then lowered into position being secured in position as before described by the action of the plate $h$ and spindle $g$ and the spring $f$. The side pieces $b^1$ are bent backwards and outwards and the whole screen bent into the required position around the hinge $b^2$ and locked by suitable means.

What I claim is:—

1. In a body of a motor vehicle the combination of a top deck, a wind screen, an elongated plate attached by hinges to the bottom of the screen and to the underside of the deck, such hinges being arranged so that the plate can be rotated through an arc from parallel to and below the deck into a vertical plane at the edge of the deck, and means for further rotating the wind screen to a position parallel to and above the deck.

2. In a body of a motor vehicle as claimed in claim 1, the elongated plate consisting of a rectangular member with a recess in the form of a shallow arch cut away along the greater part of its lower edge, hinged along its upper edge to the wind screen and hinged at the extreme ends of the lower edge to brackets depending from the underside of the deck with means for fixing the plate in a vertical plane to the deck.

3. In a body of a motor vehicle as claimed in claim 1, the elongated plate consisting of a rectangular member, with a recess in the form of a shallow arch, cut away along the greater part of its lower edge, hinged along its upper edge to the windscreen frame and hinged at the extreme ends of the lower edge to brackets depending from the under side of the deck, with means for fixing the elongated member in a vertical plane to the deck, consisting of one or more set screws passing through holes in such member and engaging threaded holes in the edge of the deck.

4. In a body of a motor vehicle the combination of a top deck, a wind screen, an elongated plate hinged to the under side of the screen and to the bottom of the deck, whereby the screen can be rotated through an arc from parallel and above, to parallel to and below the deck, and means for securing the screen against the underside of the deck.

5. In a body of a motor vehicle the combination of a top deck, a wind screen, an elongated plate hinged to the bottom of the screen and the underside of the deck, whereby the screen can be rotated through an arc from parallel and above, to parallel to and below the deck and spring clips to secure the screen on the underside of the deck.

In testimony whereof I have hereunto affixed my signature.

HAROLD IVAN FREDERICK EVERNDEN.